United States Patent
Mary et al.

(10) Patent No.: US 12,048,037 B2
(45) Date of Patent: Jul. 23, 2024

(54) METHODS AND DEVICES FOR ESTABLISHMENT OF REDUNDANT PDU SESSION

(71) Applicant: Huawei Technologies Co., Ltd., Shenzhen (CN)

(72) Inventors: Sheeba Backia Mary, Kista (SE); Andrey Krendzel, Kista (SE); Ali Hamidian, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 301 days.

(21) Appl. No.: 17/548,195

(22) Filed: Dec. 10, 2021

(65) Prior Publication Data

US 2022/0104296 A1    Mar. 31, 2022

Related U.S. Application Data

(63) Continuation of application No. PCT/EP2019/065321, filed on Jun. 12, 2019.

(51) Int. Cl.
*H04W 4/00* (2018.01)
*H04L 1/08* (2006.01)
*H04W 76/15* (2018.01)

(52) U.S. Cl.
CPC ............ *H04W 76/15* (2018.02); *H04L 1/08* (2013.01)

(58) Field of Classification Search
CPC .................. H04W 76/15; H04L 1/08
(Continued)

(56) References Cited

U.S. PATENT DOCUMENTS

2017/0366618 A1    12/2017    Vrzic et al.
2019/0356601 A1*   11/2019    Kweon ................. H04L 47/32
(Continued)

FOREIGN PATENT DOCUMENTS

CN    109076628 A    12/2018

OTHER PUBLICATIONS

"Discussion on redundant PDU Sessions in solution1," 3GPP TSG RAN WG3 NR#104, R3-192233, Reno, Nevada, US, Total 5 pages, 3rd Generation Partnership Project, Valbonne, France (May 13-17, 2019).
(Continued)

*Primary Examiner* — Chuong T Ho
(74) *Attorney, Agent, or Firm* — Leydig, Voit & Mayer, Ltd.

(57) ABSTRACT

A network function configured for operation in a mobile telecommunications network is provided. The network function is configured to obtain from a User Equipment (UE), a Protocol Data Unit, PDU, session request for establishment of a redundant PDU session and to determine said redundant PDU session to be established based on at least one network condition. The network function is configured to provide the UE the outcome of the determination if said redundant PDU session is to be established. Hereby a network function that can consider Network conditions to determine (initiate/reject) the redundant user plane feature for the URLLC services can be provided. By allowing the network to determine establishment of redundant user plane resource exhaustion can be avoided in that the UE is no longer controlling the establishment of a redundant user plane.

11 Claims, 8 Drawing Sheets

(58) Field of Classification Search
USPC .......................................... 370/329, 330, 328
See application file for complete search history.

(56) References Cited

U.S. PATENT DOCUMENTS

| | | | |
|---|---|---|---|
| 2020/0267088 A1* | 8/2020 | Navrátil ................. | H04L 43/16 |
| 2020/0275305 A1* | 8/2020 | Huang-Fu ......... | H04W 28/0268 |
| 2021/0227597 A1* | 7/2021 | Kawasaki ............ | H04W 76/12 |
| 2021/0306879 A1* | 9/2021 | Bergström ........ | H04W 28/0268 |
| 2021/0359926 A1* | 11/2021 | Miklós ................ | H04L 43/0817 |
| 2022/0038942 A1* | 2/2022 | Shi ..................... | H04W 28/0268 |
| 2022/0117015 A1* | 4/2022 | DeFoy ................. | H04W 76/11 |
| 2022/0174482 A1* | 6/2022 | Wifvesson ............ | H04W 12/37 |

OTHER PUBLICATIONS

"3rd Generation Partnership Project; Technical Specification Group Services and System Aspects; System Architecture for the 5G System; Stage 2 (Release 16)," 3GPP TS 23.501 V16.1.0, pp. 1-368, 3rd Generation Partnership Project, Valbonne, France (Jun. 2019).

"NGAP impacts for the notification about dual connectivity failure during redundant sessions establishment," 3GPP TSG-RAN WG3 #104, R3-192341, Reno, US, Total 15 pages, 3rd Generation Partnership Project, Valbonne, France (May 13-17, 2019).

"3rd Generation Partnership Project; Technical Specification Group Services and System Aspects; Procedures for the 5G System; Stage 2 (Release 16)," 3GPP TS 23.502 V16.1.1, pp. 1-495, 3rd Generation Partnership Project, Valbonne, France (Jun. 2019).

"Redundant PDU session handling," 3GPP TSG-SA WG2 Meeting #132, S2-1904765, Xi'an, China, Total 3 pages, 3rd Generation Partnership Project, Valbonne, France (Apr. 8-12, 2019).

"3rd Generation Partnership Project; Technical Specification Group Services and System Aspects; Policy and Charging Control Framework for the 5G System; Stage 2 (Release 16)," 3GPP TS 23.503 V16.1.0, pp. 1-99, 3rd Generation Partnership Project, Valbonne, France (Jun. 2019).

"3rd Generation Partnership Project; Technical Specification Group Services and System Aspects; Study on enhancement of Ultra-Reliable Low-Latency Communication (URLLC) support in the 5G Core network (5GC) (Release 16)," 3GPP TR 23.725 V16.2.0, pp. 1-93, 3rd Generation Partnership Project, Valbonne, France (Jun. 2019).

"Non-Access-Stratum (NAS) protocol for 5G System (5GS); Stage 3," 3GPP TS 24.501 V16.0.2, pp. 1-480, 3rd Generation Partnership Project, Valbonne, France (Mar. 2019).

"3rd Generation Partnership Project; Technical Specification Group Radio Access Network; Evolved Universal Terrestrial Radio Access (E-UTRA) and NR; Multi-connectivity; Stage 2 (Release 15)," 3GPP TS 37.340 V15.5.0, pp. 1-68, 3rd Generation Partnership Project, Valbonne, France (Mar. 2019).

"Clarification to support associating URLLC traffic to redundant PDU sessions," 3GPP TSG-SA WG2 Meeting #132, S2-1903200, Xi'an, P.R. China, Total 4 pages, 3rd Generation Partnership Project, Valbonne, France (Apr. 8-12, 2019).

"Correction to Redundant PDU Sessions," 3GPP TSG-SA2 Meeting #132, S2-1903626, Xi'an, P.R. China, Total 4 pages, 3rd Generation Partnership Project, Valbonne, France (Apr. 8-12, 2019).

ZTE, "PCR for TS38.413 on higher layer multiple connectivity solution#1," 3GPP TSG RAN WG3 NR#104, R3-192234, Reno, Nevada, US, Total 13 pages, 3rd Generation Partnership Project, Valbonne, France (May 13-17, 2019).

* cited by examiner

METHODS AND DEVICES FOR ESTABLISHMENT OF REDUNDANT PDU SESSION

CROSS-REFERENCE TO RELATED APPLICATIONS

This application is a continuation of International Application No. PCT/EP2019/065321, filed on Jun. 12, 2019, the disclosure of which is hereby incorporated by reference in its entirety.

TECHNICAL FIELD

Embodiments of the disclosure relate to a network function of a telecommunication network. In particular embodiments of the disclosure relate to establishment of redundant Protocol Data Unit (PDU) sessions.

BACKGROUND

5G System (5GS) is enhanced to support Ultra Reliable Low Latency Communication (URLLC) through redundant transmission for high reliability communication. In order to ensure the high reliability which can hardly be achieved by single path on user plane, redundant transmission in 5GS is supported. Depending on the condition of network deployment, e.g., which Network Functions (NFs) or segments cannot meet the requirements of reliability, the redundant transmission may be applied on the user plane path between a User Equipment (UE) and the network.

In accordance with 3gpp specification 23.501 release 16, 5G networks can thus provide redundant PDU sessions. For example, in contribution S2-1903626 to 3gpp specification 23.501—System architecture for the 5G System (5GS), the UE triggers the establishment/modification of a first PDU Session normally. A session management function (SMF) determines whether a redundant PDU Session is required and informs the UE accordingly. The UE requests the establishment of a second PDU Session.

The architecture for end to end redundant User Plane paths using Dual Connectivity is shown in FIG. 1.

There is a constant desire to improve on existing technology within the telecommunication industry and to improve the working of telecommunications system such as the 5G system.

SUMMARY

As has been realized, there is a need for an improved operation of redundant PDU session establishment in telecommunications networks, in particular 5G networks.

It is therefore an object of the disclosure to provide an improved procedure for establishment of redundant PDU session in telecommunications networks.

These objects and or other objects are obtained by devices and methods and computer programs as set out in the appended claims.

In accordance with a first aspect of the disclosure, a network function configured for operation in a mobile telecommunications network is provided. The network function is configured to obtain from a User Equipment (UE) a Protocol Data Unit (PDU) session request for establishment of a redundant PDU session and to determine said redundant PDU session to be established based on at least one network condition. The least one network condition comprises one or many of:

a threshold of network load,
a threshold of network function load,
a threshold of network function service load,
a threshold of network function performance,
a threshold of network function Quality of Service, QoS, support, or
a threshold of network QoS support The network function is configured to provide the UE of the outcome of the determination if said redundant PDU session is to be established.

Hereby a network function that can consider Network conditions to determine (initiate or reject) the redundant user plane feature for ultra reliable low latency communications (URLLC) services can be provided. By allowing the network to determine establishment of redundant user plane resource exhaustion can be avoided in that the UE is no longer controlling the establishment of a redundant user plane. The PDU session request can be a request for a second redundant, PDU session from a UE involved in a first PDU session. The PDU session request can be a request for an URLLC service.

In accordance with a first implementation of the first aspect, the network function is configured to provide the UE with an indication as to why a redundant session cannot be established when it is determined that said redundant PDU session cannot be established. The network function is configured to send at least one of indications:
Redundancy Not Supported;
Redundancy Not Required;
Resource Not Available for Redundant User plane;
Redundancy user plane supported with other network options;
when the redundant PDU session cannot be established.

Hereby, the UE will know the specific reason why the network has released the requested redundant PDU session. Such Redundant User plane/PDU session initiation failure information to the UE can avoid that the UE repeatedly request for a redundant PDU session:

In accordance with a second implementation of the first aspect, the network function is configured to verify that the obtained request for a redundant PDU session from a UE is to be established before establishing a redundant PDU session for said UE.

In accordance with a third implementation of the first aspect 4 the network function is configured to verify that the obtained request for a redundant PDU session from a UE is to be established by determining that preconfigured redundancy information for the UE in the obtained request for a redundant PDU session matches with redundancy information available at the network for the UE and an Ultra Reliable Low Latency Communication, URLLC, service for the UE.

In accordance with a fourth implementation of the first aspect, the network function is configured to
verify that the obtained request for a redundant PDU session from a UE is to be established by determining that at least one network condition is met.

In accordance with a fifth implementation of the first aspect, the network function is configured to
obtain a list of redundancy policies for at least one UE, and
configure the redundant PDU session for a UE based on the redundancy policy associated with the UE in the list of redundancy policies.

Also, the network function can store the obtained list.

In accordance with a second aspect of the disclosure, a user equipment, UE, is configured to operate in a mobile telecommunications network. The UE is configured to support a redundant PDU session. The UE is configured to send a PDU session request message, wherein said PDU session request message comprises a redundancy specific value indicating a redundancy status of the requested PDU session. The redundancy specific value can be an information element (IE) comprising an indication that the requested PDU session is a redundant session or a redundant PDU Initial Request. The redundancy specific value can be an IE comprising an indication that the requested PDU session is an existing redundant PDU session.

In accordance with a first implementation of the second aspect, the UE is configured to obtain from the network a policy indicating a redundant PDU session can be established, and provide a request for a redundant PDU session only when the received policy indicates that a PDU session can be established. Hereby the load in the network resulting from request for a redundant PDU session can be reduced.

The disclosure also extends to methods and computer programs supporting the aspects set out above.

DETAILED DESCRIPTION

Figure 1:
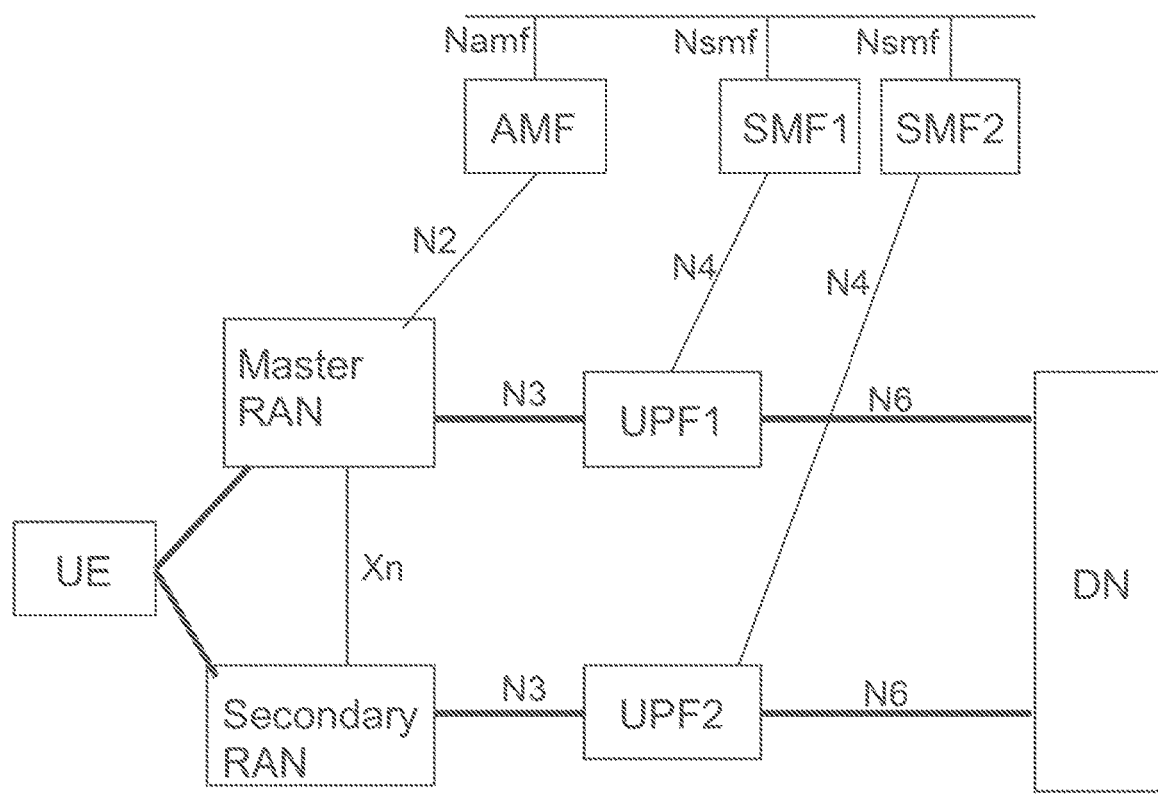
FIG. 1 shows an exemplary architecture for end to end redundant User Plane paths using Dual Connectivity.

The disclosure will now be described in detail hereinafter with reference to the accompanying drawings, in which certain embodiments of the invention are shown. The disclosure may, however, be embodied in many different forms and should not be construed as limited to the embodiments set forth herein; rather, these embodiments are provided by way of example so that this disclosure will be thorough and complete, and will fully convey the scope of the disclosure to those skilled in the art. Like numbers refer to like elements throughout the description.

As has been realized, the current 3GPP specifications 23.501 and 23.502 release 16 and related to establishment of redundant Protocol Data Unit, PDU, sessions can be improved. In particular it has been realized that a UE based/controlled User plane redundancy initiation can lead to Resource exhaustion: Therefore, a network-based solution can be advantageous as a UE based solution which initiates redundant user plane by itself can lead to resource exhaustion.

As has further been realized, a lack of sufficient Redundant User plane/PDU session initiation failure information to the UE may trigger the UE to repeatedly request for a redundant PDU session. Thus, even when a Network determination is performed to determine whether to accept or deny a UE initiated redundant PDU sessions, the UE will be unaware of the reason as to why the network has released/denied a requested redundant PDU session. According to the current specification (TS 23.503) in the case of network rejection of the PDU Session Establishment Request, the UE may trigger a new PDU Session establishment based on the rejection cause and the UE Route Selection Policy (URSP policy). The UE may be provisioned with URSP rules by PCF of the Home Public Land Mobile Network (HPLMN). In addition, the UE may be also pre-configured with URSP rules (e.g. by the operator). Currently, there is no user plane redundancy specific 5G session management (SGSM) cause values for PDU session failure/rejection which can let the UE know that redundancy is not supported or required according to the network. If this redundancy specific failure information is not provided by the network to the UE, then the UE will not know that it should not retry to initiate any related PDU session establishment procedure. The UE will try to initiate PDU sessions with all possible URSP rules which can then lead to undesired resource exhaustion and signaling overhead. The proposed SGSM cause values related to the redundant user plane failure cases can be can be sent by the network function (example: SMF) to the UE in any of the following NAS messages such as a PDU Session Establishment Reject Message and/or a PDU Session Modification Reject Message.

In accordance with the present disclosure, a network condition-based user plane redundancy initiation and control mechanism for URLLC services can be provided to prevent resource exhaustion in 5GS. For example, 1) A UE is not provided a redundant PDU session unless the network determines that a redundant PDU session is required for a UE's URLLC service. 2) a UE can be not allowed to request a redundant PDU session unless the network triggers the user plane redundancy for any PDU session related to a Single Network Slice Selection Assistance Information (S-NSSAI) such as through an indication during a PDU session establishment procedure or a configuration done by the network at the UE side based on the network node's or function's QoS monitoring results or load/performance analytics provided by the NWDAF through PCF. The network node's/function's QoS monitoring results and/or load and performance status can be used to find of a network node/function has the capability to reliably support an URLLC service and so this information can be provided by the NWDAF or PCF to the SMF (as a user plane redundancy policy) which can be used by the SMF to determine whether an user plane redundancy is required or not for the UE.

In accordance with a first embodiment, the network is tasked with redundant user plane requirement determination and related redundant PDU session initiation. The network can determine the requirement for the user plane redundancy when a UE sends a PDU session initiation request message. The network can determine to initiate Redundant PDU session based on the network conditions such as network load, NF service load, or Network Quality of Service (QoS) support. These network conditions in 5GS can be analyzed/identified based on monitoring, real time or predictions. The indication for the redundancy requirement related to the request PDU session can be notified to the UE by the network during the PDU session establishment procedure. The UE can then send a request for redundant user plane through redundant PDU session initiation request message based on the indication sent by the network and can also include the network sent authorization information for initiating the redundant user plane. The network can validate the redundant user plane request based on the previously sent indication to the UE and the network can trigger redundancy of user plane at the network side for example using dual connectivity or any operator specific mechanism. The Validation at the network can for example be a verification/matching of preconfigured redundancy information at the UE sent in the PDU session request message to the network, with the redundancy information available at the network for an UE and its corresponding URLLC service or the validation can be a verification/matching of the URLLC service related PDU session request from the UE and its eligibility to get compliment redundant user plane support due to network node's or function's reliability measures such as one/more network node/function conditions such as QoS monitoring results, load/performance results used to determine if a redundant PDU session is to be established. The network can derive and store a Redundant User plane policy based on the network conditions to support this validation and user plane redundancy determination.

Figure 2:
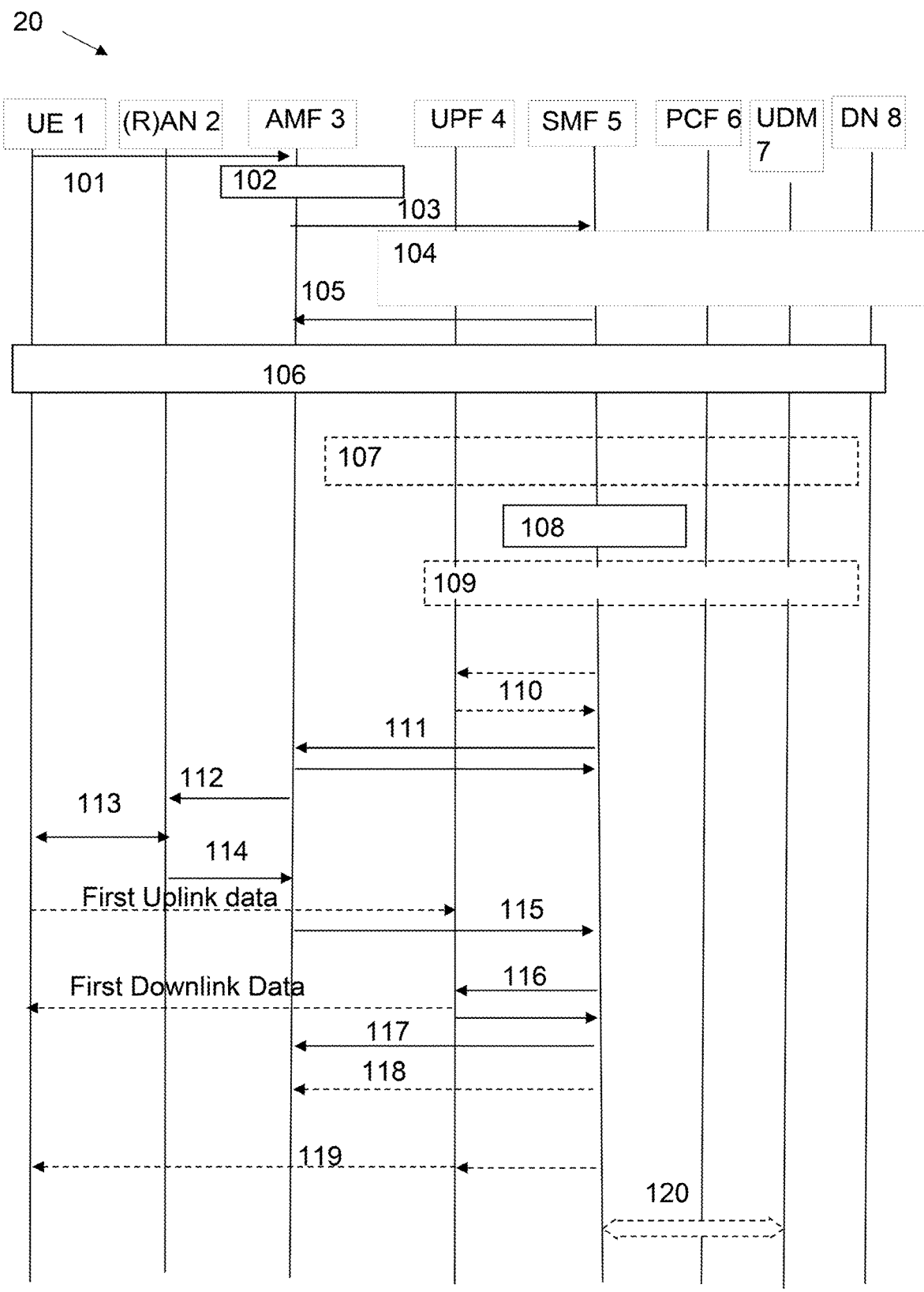
FIG. 2 is an example of a signaling diagram in a telecommunications system network controlled redundant User Plane.

In FIG. 2, a signaling diagram in a telecommunications system 20 illustrating the first embodiment is shown. First in a step 101 a UE 1 initiates a UE Requested PDU Session Establishment procedure by the transmission of a Non-Access Stratum (NAS) message containing a PDU Session Establishment Request within the N1 SM container, via the (Radio) Access Network (RAN) 2. The Request Type indicates "Initial request" or "Redundant UP Initial request" if the PDU Session Establishment is a request to establish a new PDU Session and indicates "Existing PDU Session" or "Existing Redundant UP PDU Session" if the request refers to an existing PDU Session switching between 3GPP access and non-3GPP access or to a PDU Session handover from an existing Packet Data Network (PDN) connection in the Evolved Packet Core (EPC). Next, in a step 102, the Access and Mobility Management Function (AMF) 3 selects a Session Management Function (SMF) 5. The AMF 3 sends to SMF 5 in a step 103, Nsmf_PDUSession_CreateSMContext Request (SUbscription Permanent Identifier, SUPI, Data Network Name, DNN, S-NSSAI(s), PDU Session ID, AMF ID, Request Type, Policy Control Function (PCF) ID, Priority Access, N1 SM container (PDU Session Establishment Request), User location information, Access Type, PEI, GPSI, UE presence in LADN service area, Subscription For PDU Session Status Notification, DNN Selection Mode, Trace Requirements, Control Plane CIoT 5GS Optimisation indication) or Nsmf_PDUSession_UpdateSMContext Request (SUPI, DNN, S-NSSAI(s), SM Context ID, AMF ID, Request Type, N1 SM container (PDU Session Establishment Request), User location information, Access Type, RAT type, PEI). The steps 101-103 can be performed in accordance with 3GPP Technical specification TS 23.502 4.3.2.2.1.

Next, in a step 104, the SMF 5 verifies the QoS Monitoring results and current NF(s) QoS/load condition to determine the User Plane (UP) redundancy for the requested PDU session specific to the s-NSSAI for an URLLC service. If the QoS monitoring results are not available, then the SMF can request the NF specific QoS status analytics from the Network Data Analytics Function (NWDAF) or trigger a NF QoS monitoring procedure with User Plane Function (UPF)/gNB and can use the result to determine the UP redundancy need. When the SMF 5 determines to have UP redundancy for the PDU session, the SMF generates a Redundancy Indicator (RSN1) corresponding to the initial PDU Session 1 and a Redundancy Indicator (RSN2) corresponding to the redundant PDU session 2 that need to be established subsequently. Redundant PDU session 2 always corresponds to the initial PDU Session 1. In accordance with some embodiments, network conditions such as network load, NF service load, or Network QoS support. These network conditions in 5GS can be analyzed/identified based on monitoring, real time or predictions. The network conditions can also be provided as analytics by NWDAF or by any operator specific procedure. In the step 104 the network function is in accordance with some embodiments configured to verify that the obtained request for a redundant PDU session from a UE is to be established before establishing a redundant PDU session for said UE. In accordance with one embodiment the network function is configured to verify that the obtained request for a redundant PDU session from a UE is to be established by determining that preconfigured redundancy information for the UE in the obtained request for a redundant PDU session matches with redundancy information available at the network for the UE and an Ultra Reliable Low Latency Communication, URLLC, service for the UE. In accordance with one embodiment the network function is configured to verify that the obtained request for a redundant PDU session from a UE is to be established by determining that at least one network condition is met. Next, in a step 105, the SMF 5 sends to AMF 3, the Nsmf_PDUSession_CreateSMContext Response (Cause, SM Context ID or N1 SM container (PDU Session Reject (Cause))) accordingly. The PDU Session Reject (Cause) can be specific to the redundancy determination outcome at the network which can be Redundancy not supported or Redundancy not required or any information related to user plane redundancy case. Then, in a step 106 an Optional Secondary authentication/authorization can be performed. Then, in a step 107, if dynamic Policy Control and Charging (PCC) is to be used for the PDU Session, the SMF performs PCF selection as described in TS 23.501, clause 6.3.7.1. Otherwise, the SMF may apply local policy. The SMF can in accordance with some embodiments perform an SM Policy Association Establishment procedure as defined in TS 23.501 clause 4.16.4 to establish an SM Policy Association with the PCF and get the default PCC Rules for the PDU Session. Then, in a step 108, if the Request Type in step 103 indicates "Initial request" or "Redundant UP Initial request", the SMF selects a Secondary Serving Cell (SSC) mode for the PDU Session as described in TS 23.501 clause 5.6.9.3. The SMF 5 also selects one or more UPFs as needed as described in TS 23.501 clause 6.3.3. The SMF 5 may then in a step 109 perform an SMF initiated SM Policy Association Modification procedure as defined in clause 4.16.5.1 to provide information on the Policy Control Request Trigger condition(s) that have been met. Then, in a step 110 If Request Type indicates "initial request" or "Redundant UP Initial request", the SMF 5 initiates an N4 Session Establishment procedure with the selected UPF, otherwise it initiates an N4 Session Modification procedure with the selected UPF. The steps 105-110 can be the same as procedures in TS 23.502 4.3.2.2.1.

Next, in a step 111, the SMF 5 sends to the AMF 3, the Namf_Communication_N1N2MessageTransfer (PDU Session ID and the N2 SM information along with RSN1, RSN2 and the Redundancy status information. The Redundancy Status information can include values or an indicator to denote whether a Redundancy is required or not for a particular PDU session/QoS flow of the PDU session. The N2 SM information includes (PDU Session ID, QFI(s), QoS Profile(s), CN Tunnel Info, S-NSSAI from the Allowed NSSAI, Session-AMBR, PDU Session Type, User Plane Security Enforcement information, UE Integrity Protection Maximum Data Rate, RSN), N1 SM container (PDU Session Establishment Accept (QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), P-CSCF address(es), Header Compression Configuration, [Always-on PDU Session]))). If multiple UPFs are used for the PDU Session, the CN Tunnel Info contain tunnel information related with the UPF that terminates N3. The AMF can store the RSN1, RSN2, Redundancy Status received from the AMF to identify the subsequent Redundant PDU session request for same SMF selection.

Thus, the network function, the SMF 5, is configured to obtain from a User Equipment, UE 1, a Protocol Data Unit, PDU, session request for establishment of a redundant PDU session in step 103. The SMF 5 is configured to determine in step 104 said redundant PDU session to be established based on at least one condition, wherein said at least one condition comprises one or many of:
- a threshold of network load,
- a threshold of network function load,
- a threshold of network function service load,
- a threshold of network function performance,
- a threshold of network function QoS support, or
- a threshold of network QoS support The SMF 5 is also configured to provide in step 111 the UE 1 of the outcome of the determination if said redundant PDU session is to be established.

In accordance with one embodiment, based on the QoS monitoring result/network or NF load information available at the SMF 5/UPF 4/PCF 6 or provided by the NWDAF, either the SMF or PCF can provide the Dual Connectivity (DC)/Redundant UP initiate trigger message to M-gNB to trigger the DC procedure or any operator specific procedure to support UP redundancy.

Next, in a step 112, the AMF 3 sends to (R)AN 2 the N2 PDU Session Request (N2 SM information, NAS message (PDU Session ID, N1 SM container (PDU Session Establishment Accept, RSN1, RSN2, Redundancy Status (Required/Not Required))), CN assisted RAN parameters tuning). The AMF sends the NAS message containing PDU Session ID, RSN1, RSN2, Redundancy Status and PDU Session Establishment Accept targeted to the UE and the N2 SM information received from the SMF within the N2 PDU Session Request to the (R)AN. If the SMF derived CN assisted RAN parameters tuning are stored for the activated PDU Session(s), the AMF may derive updated CN assisted RAN parameters tuning and provide them the (R)AN. The (R)AN can store the RSN1, RSN2, Redundancy Status received from the AMF to identify the subsequent Redundant PDU session request for same AMF selection. Then, in a step 113, (R)AN forwards the NAS message (PDU Session ID, RSN1, RSN2, Redundancy Status, N1 SM container (PDU Session Establishment Accept)) provided in step 12 to the UE.

The steps 111-113 can be implemented in accordance with TS 23.502 4.3.2.2.1 except carrying RSN1, RSN2 and the Redundancy status information in step 111.

The final steps 114-120 can be implemented in accordance with the procedures 14-20 as described in 3GPP Technical Specification TS 23.502 clause 4.3.2.2.1.

Figure 3:
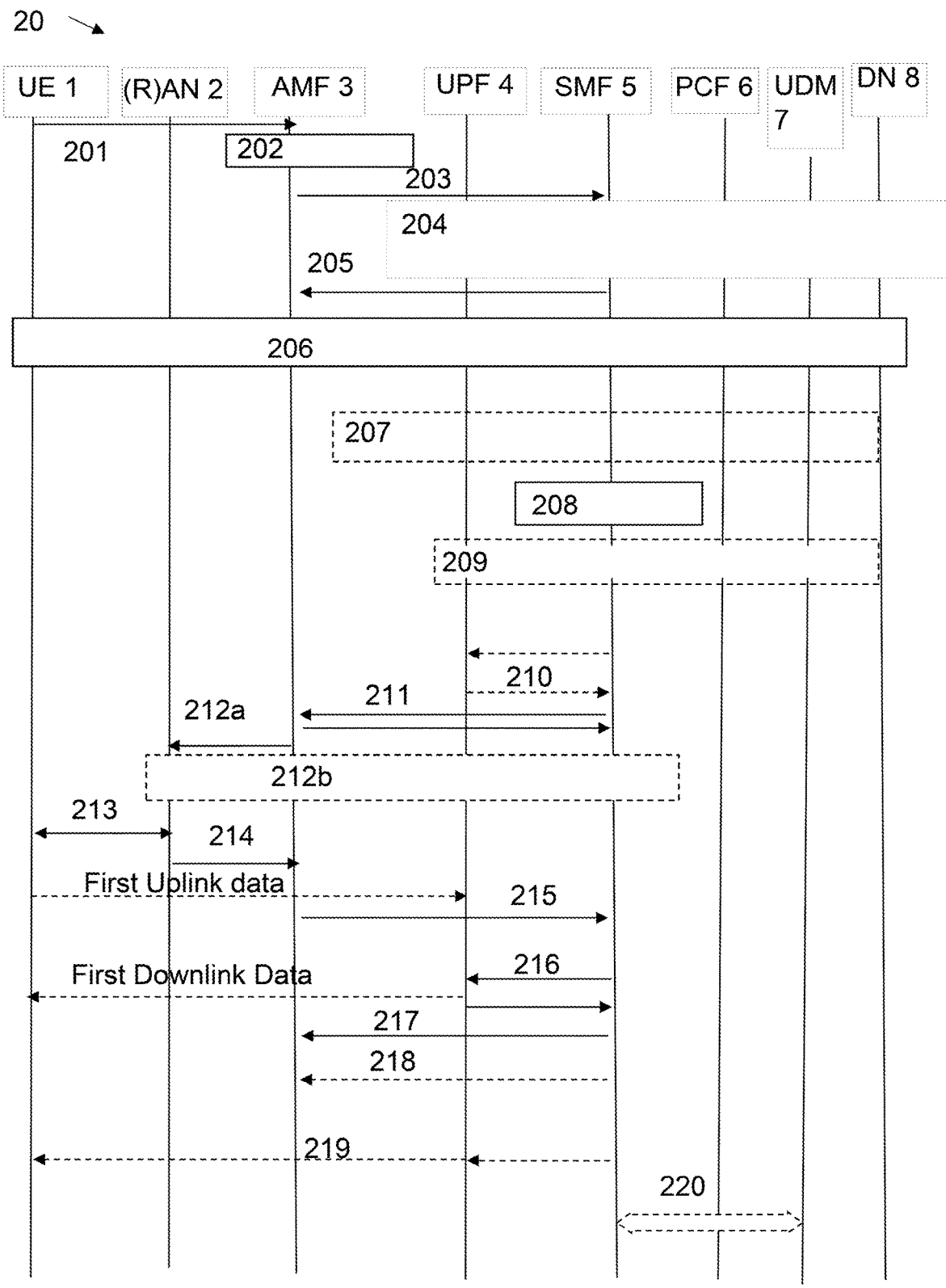
FIG. 3 is an example of a signaling diagram in a telecommunications system network controlled redundant User Plane.

In FIG. 3, a second embodiment is shown. In accordance with the second embodiment, the UE 1 first in a step 201, sends the PDU session establishment message for the redundant PDU session with the request type "Redundant UP Initial Request/additional" along with the corresponding "RSN2" received from the network during the initial PDU establishment. In accordance with one embodiment, the request type field of the redundant PDU session can contain any special indication specific to the user plan redundancy to differentiate it from the normal initial PDU session. Hereby, the UE 1 is configured to operate in a mobile telecommunications network 20, where the UE is configured to support a redundant PDU session, and further configured to send a PDU session request message, wherein said PDU session request message comprises a redundancy specific value indicating a redundancy status of the requested PDU session. Thus, when there is a redundant PDU session requests comes from a UE and if the network determines not to have user plane redundancy as the network finds that the network nodes and network functions are capable enough to reliably support a URLLC service, then the network will not know which PDU session request from the UE need to be rejected. If the redundant PDU session request coming from the UE has indications for "redundant PDU session", then the network can reject only the PDU session containing redundancy indicator and the network can accept the other normal PDU session request coming from the UE.

Next, a step 202 corresponding to step 102 above can be performed. Then, in a step a 203, the AMF 3 can send to SMF 5, the Nsmf_PDUSession_CreateSMContext Request (SUPI, DNN, S-NSSAI(s), RSN2, PDU Session ID, AMF ID, Request Type, PCF ID, Priority Access, N1 SM container (PDU Session Establishment Request), User location information, Access Type, PEI, GPSI, UE presence in LADN service area, Subscription For PDU Session Status Notification, DNN Selection Mode, Trace Requirements, Control Plane CIoT 5GS Optimisation indication) or Nsmf_PDUSession_UpdateSMContext Request (SUPI, DNN, S-NSSAI(s), SM Context ID, AMF ID, Request Type, N1 SM container (PDU Session Establishment Request), User location information, Access Type, RAT type, PEI).

Next, in a step 204, the SMF 5verifies the "RSN2" stored locally and can also check the QoS Monitoring results and current network or NF(s) QoS/load condition to trigger/accept the UP redundancy. In accordance with some embodiments, Network conditions such as network load, NF service load, or Network QoS support can be analyzed/identified based on monitoring, real time or predictions. The network conditions can also be provided as analytics by NWDAF or by any operator specific procedure.

Next, in a step 205, The SMF 5 can send to AMF 3, the Nsmf_PDUSession_Create_SMContext Response (Cause, SM Context ID or N1 SM container (PDU Session Reject (Cause))) accordingly. The RSN2 may be sent optionally. In accordance with some embodiments, If the SMF 5 determines based on the network conditions that redundancy is required and if the RSN2 received from the UE is same as the once stored at the network, the verification succeeds and the N1 SM container contains "PDU Session Establishment Accept", then the Redundancy Status will contain "Success" and if the network determines that the User plane redundancy is not required due to the network or NF conditions defined earlier, then the "PDU Session Establishment Failure" is sent to the UE along with the cause value "Redundancy Not Required/Not Supported/Resource not available" and Redundancy status "Failure". In accordance with some embodiments, the 5G Session Management (SGSM) can contain information element to include the following one or more new clause values specific to the Redundant PDU session establishment failure such as:

i. Redundancy Not Supported (Size: Any 8 bits)
  ii. Redundancy Not Required (Size: Any 8 bits)
  iii. Resource Not Available for Redundant User plane (Size: Any 8 bits)

Thus, the network function is configured to provide the UE with an indication as to why a redundant session cannot be established when it is determined that said redundant PDU session cannot be established. The network function is configured to send at least one of indications:

Redundancy Not Supported;
Redundancy Not Required;
Resource Not Available for Redundant User plane;
Redundancy user plane supported with other network options;
when the redundant PDU session cannot be established.

Next, in a step 206 an Optional Secondary authentication/authorization can be performed as in step 106.

Next, in a step 207, if dynamic PCC is to be used for the PDU Session, the SMF 5 can performs PCF selection as described in TS 23.501, clause 6.3.7.1. Otherwise, the SMF 5 can apply local policy. Also, the SMF 5 may perform a Session Management, SM, Policy Association Establishment procedure as defined in TS 23.501 clause, 4.16.4 to establish an SM Policy Association with the PCF and get the default PCC Rules for the PDU Session.

Then, in a step 208, if the Request Type in step 203 indicates "Redundant Initial request", the SMF selects an SSC mode for the PDU Session as described in TS 23.501 clause 5.6.9.3. The SMF 5 can also selects one or more UPFs different from the UPFs selected for the PDU session related to RSN1 as needed as described in TS 23.501 clause 6.3.3.

Next, in a step 209, the SMF 5 may perform an SMF initiated SM Policy Association Modification procedure as defined in TS 23.501 clause 4.16.5.1 to provide information on the Policy Control Request Trigger condition(s) that have been met.

Next, in a step 210, if Request Type indicates "Redundant initial request", the SMF 5 initiates an N4 Session Establishment procedure with the selected UPF, otherwise it initiates an N4 Session Modification procedure with the selected UPF.

Next, in a step 211, the SMF 5 can send to the AMF 3, the Namf_Communication_N1N2MessageTransfer (PDU Session ID and the N2 SM information along with RSN1 (optionally), RSN2 and the Redundancy status information. The Redundancy Status information can include values/indicator to denotes whether a Redundancy PDU initiation is successful or not (failure) for a particular PDU session/QoS flow of the PDU session. The N2 SM information includes (PDU Session ID, QFI(s), QoS Profile(s), CN Tunnel Info, S-NSSAI from the Allowed NSSAI, Session-AMBR, PDU Session Type, User Plane Security Enforcement information, UE Integrity Protection Maximum Data Rate, Redundancy Status (Success/Failure), RSN1 (optionally), RSN2), N1 SM container (PDU Session Establishment Accept (QoS Rule(s) and QoS Flow level QoS parameters if needed for the QoS Flow(s) associated with the QoS rule(s), selected SSC mode, S-NSSAI(s), DNN, allocated IPv4 address, interface identifier, Session-AMBR, selected PDU Session Type, Reflective QoS Timer (if available), P-CSCF address (es), Header Compression Configuration, [Always-on PDU Session]))). If multiple UPFs are used for the PDU Session, the CN Tunnel Info contain tunnel information related with the UPF that terminates N3. The AMF can store the RSN1, RSN2, Redundancy Status received from the AMF to identify the subsequent Redundant PDU session request for same SMF selection. In accordance with some embodiments, based on the QoS monitoring result/network (gNB) or NF (UPF/SMF/PCF) load information available at the SMF/UPF/PCF or provided by the NWDAF, either the SMF 5 or PCF 6 can provide the Dual Connectivity (DC)/Redundant UP initiate trigger message to M-gNB to trigger the DC procedure or any operator specific procedure to support UP redundancy.

Then, in a step 212, the AMF 3 sends to (R)AN 2 the N2 PDU Session Request (N2 SM information, NAS message (PDU Session ID, N1 SM container (PDU Session Establishment Accept, RSN1, RSN2, Redundancy Status (Success/Failure))), CN assisted RAN parameters tuning). The AMF sends the NAS message containing PDU Session ID, RSN1, RSN2, Redundancy Status and PDU Session Establishment Accept targeted to the UE and the N2 SM information received from the SMF within the N2 PDU Session Request to the (R)AN. If the SMF derived CN assisted RAN parameters tuning are stored for the activated PDU Session (s), the AMF may derive updated CN assisted RAN parameters tuning and provide them the (R)AN. The (R)AN can verify and update the Redundancy Status according to the stored the RSN1, RSN2 received from the AMF to act accordingly. Based on the RSN2 the gNB can initiate the redundant user plane using dual connectivity or using any operator specific mechanism. In accordance with some embodiments, the 5G Session Management (SGSM) cause information element can include the following one or more new clause values specific to the Redundant PDU session establishment failure:

i. Redundancy Not Supported (Size: Any 8 bits)
  ii. Redundancy Not Required (Size: Any 8 bits)
  iii. Resource Not Available for Redundant User plane (Size: Any 8 bits)

Next, in a step 213, the (R)AN 2 forwards the NAS message (PDU Session ID, RSN1, RSN2, Redundancy Status (Success/Failure), N1 SM container (PDU Session Establishment Accept)) provided in step 212 to the UE 1. In accordance with one embodiment, if the N1 SM container contains "PDU Session Establishment Accept", then the Redundancy Status will contain "Success" and if the network determines that the User plane redundancy is not required due to the network or NF conditions defined earlier, then the "PDU Session Establishment Failure" is sent to the UE along with the cause value or Redundancy status "Failure".

Finally, the steps 214-220 can be the same as the steps 114-120 above.

Figure 4:
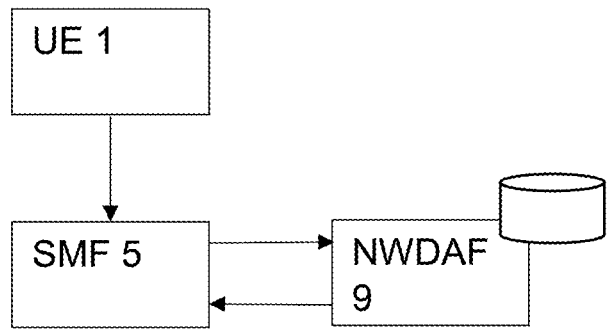
FIG. 4 shows an implementation of a redundant user plane determination at an SMF with support of a network data analytics function (NWDAF)

In FIG. 4 an implementation of a redundant user plane determination at an SMF with support of an NWDAF 9 is illustrated. Thus, when a UE 1 sends a PDU session establishment message, the SMF 5 can check if there is any recent network analytics that can be used. The check can in accordance with some embodiments be performed by checking a user plane redundancy policy. If there is no reliable network analytics that can be used, the SMF can request such network analytics from the NWDAF 9 and receive a message responsive to the request to be used when determining establishment of a redundant user plane.

Figure 5:
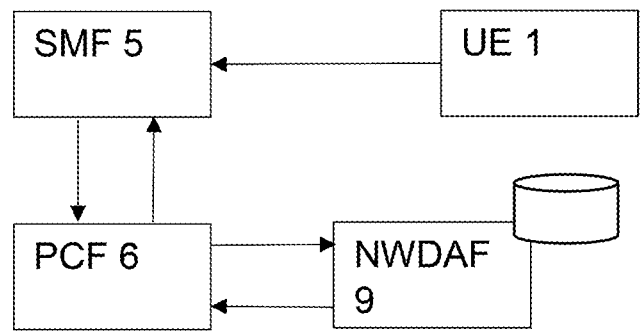
FIG. 5 shows an implementation of a redundant user plane determination at an SMF along with the PCF with support of an NWDAF.

In FIG. 5 an implementation of a redundant user plane determination at an SMF along with the PCF with support of an NWDAF 9 is illustrated. Thus, when a UE 1 sends a PDU session establishment message, the SMF 5 can check if there is any recent network analytics that can be used. The check can sometimes be in the form of checking a user plane redundancy policy. If there is no reliable network analytics that can be used, the SMF can request a valid user plane redundancy policy from the PCF 6. If the PCF has a relevant user plane redundancy policy the user plane redundancy policy is provided to the SMF. If no user plane redundancy policy is available at the PCF, the PCF can request network analytics from the NWDAF 9 and receive a message responsive to the request to be used to determine a redundant user plane policy. The user plane redundancy policy can then be provided to the SMF 5 to support the decision when determining establishment of a redundant user plane at the SMF 5. The user plane redundancy policy is derived from the network node and function's QoS monitoring results, QoS change analytics, load and performance analytics information. These information can base used by the PCF to find if a particular network node or function can support a reliable URLLC service.

Figure 6:
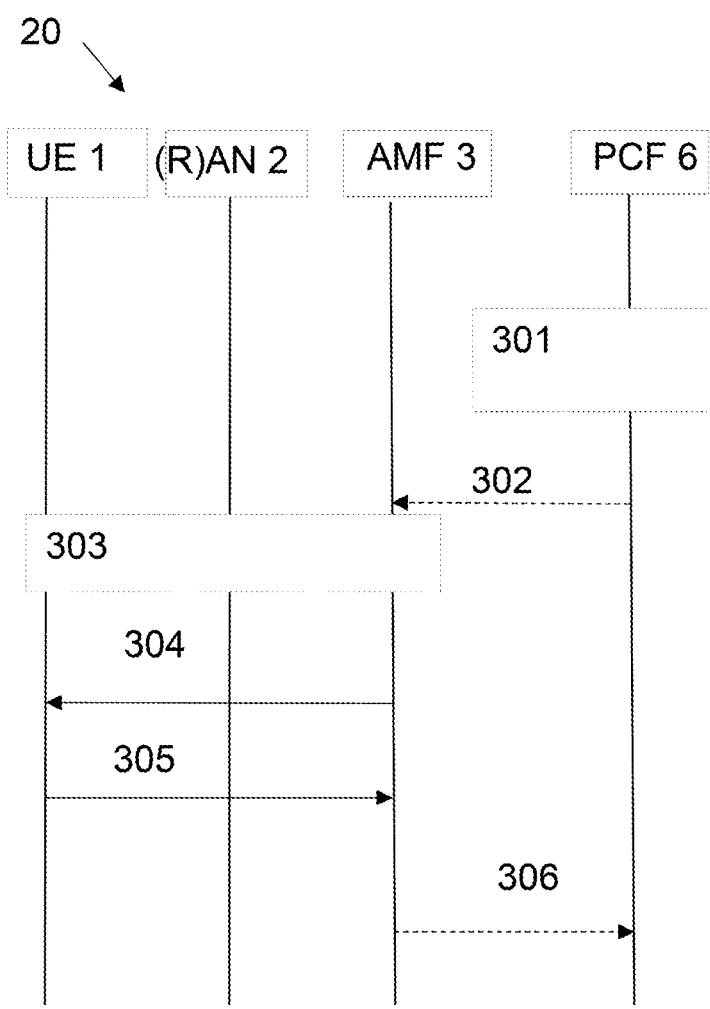
FIG. 6 is a signaling diagram in a telecommunications system network where the network can configure the UE with redundancy requirement information.

In accordance with some embodiments the network 20 can configure the UE 1 with the slice/service (s-NSSAI) specific redundancy requirement information based on the Network or NF Conditions identified/analyzed by the core network, CN, elements or functions as shown in FIG. 6. The procedure aims to configure the Redundant User plane policy at the UE 1 beforehand based on the network or network function conditions to support the UE 1 to initiate the redundant PDU sessions, without waiting for the network decision during the initial PDU session. This invention helps the network to determine about the requirement for redundant user plane in an earlier stage and to configure the UE accordingly.

In accordance with the embodiment with FIG. 6, first a step 301 is performed. The step 301 can be initiated when the PCF 6 receives QoS Monitoring Results or NF(s) QoS/load conditions to update the UE redundant UP policy and PDU Session selection related policy information in the UE configuration. In the non-roaming case, the Visited PCF V-PCF is not involved and the role of the Home PCF H-PCF is performed by the PCF 6. For the roaming scenarios, the V-PCF interacts with the AMF 3 and the H-PCF interacts with the V-PCF. In other words, this procedure can be initiated by the PCF when the required/expected service level cannot be provided by the network for certain slices/services related to the UE subscription due to the network condition. Network conditions can also be defined/determined based on network load, NF service load, or Network QoS support (QoS monitoring results or analytics information). These network conditions in 5GS can be analyzed/identified based on monitoring, real time or predictions. The network conditions can also be provided as analytics by NWDAF or by any operator specific procedure. The PCF 6 decides to update redundant UP policy based on triggering conditions such as an initial registration, changes in the threshold of the network/network function conditions, NF QoS support (QoS monitoring results) or when a trigger is received from the network during a PDU session establishment procedure. Hence, the PCF 6 establishes a policy for the redundant user plane. This policy can be used to form a list required redundant user plane use. The SMF performs the determination of user plane redundancy based on the user plane redundancy policy provided by the PCF. The PCF can create and distribute the user plane redundancy policies to the SMF and can also distribute the user plane redundancy policies UE.

Hence, the network function is configured to obtain a list of redundancy policies for at least one UE, and to configure the redundant PDU session for a UE based on the redundancy policy associated with the UE in the list of redundancy policies. Also, the network function can store the obtained list.

Next, in a step 302, the PCF 6 sends the Redundant UP policy that can comprise a list of s-NSSAI(s)/SST that needs UP redundancy along with a "UP Redundancy Identifier" generated by the PCF/network to the AMF 3.

Next, a step 303 is performed. Step 303 can be implemented in accordance with step 2 in TS 23.502 Clause 4.2.4.3 modified to support the following. If the UE is registered and reachable by AMF in either 3GPP access or non-3GPP access, AMF shall transfer transparently the UE Policy container to the UE via the registered and reachable access. If the UE is registered in both 3GPP and non-3GPP accesses and reachable on both access and served by the same AMF, the AMF transfers transparently the UE Policy container to the UE via one of the accesses based on the AMF local policy.

Next, in a step 304, if the UE is in CM-CONNECTED over 3GPP access or non-3GPP access, the AMF 3 transfers transparently the UE Redundant UP Policy container (PDU Session selection related policy information) received from the PCF 6 to the UE 1.

Then, in a step 305, the UE updates the UE Redundant UP policy provided by the PCF and sends the result to the AMF.

Next, in a step 306, if the AMF received the UE Redundant UP Policy container and the PCF subscribed to be notified of the reception of the UE Policy container then the AMF forwards the response of the UE to the PCF using Namf_N1MessageNotify.

The PCF maintains the latest list of UE Redundant UP policy delivered to the UE and updates the latest list in the UDR by invoking Nudr_DM_Update (SUPI, Redundant UP Policy Data, Policy Set Entry) service operation. This is indicated by step 307. The SMF 5 can provide the Redundant UP required information along with the QoS rules to the UE or it can be preconfigured in the UE. Hereby the UE is configured to obtain from the network a policy indicating a redundant PDU session can be established, and the UE can be configured to provide a request for a redundant PDU session only when the received policy indicates that a PDU session can be established. Hereby the load in the network resulting from request for a redundant PDU session can be reduced.

Figure 7:
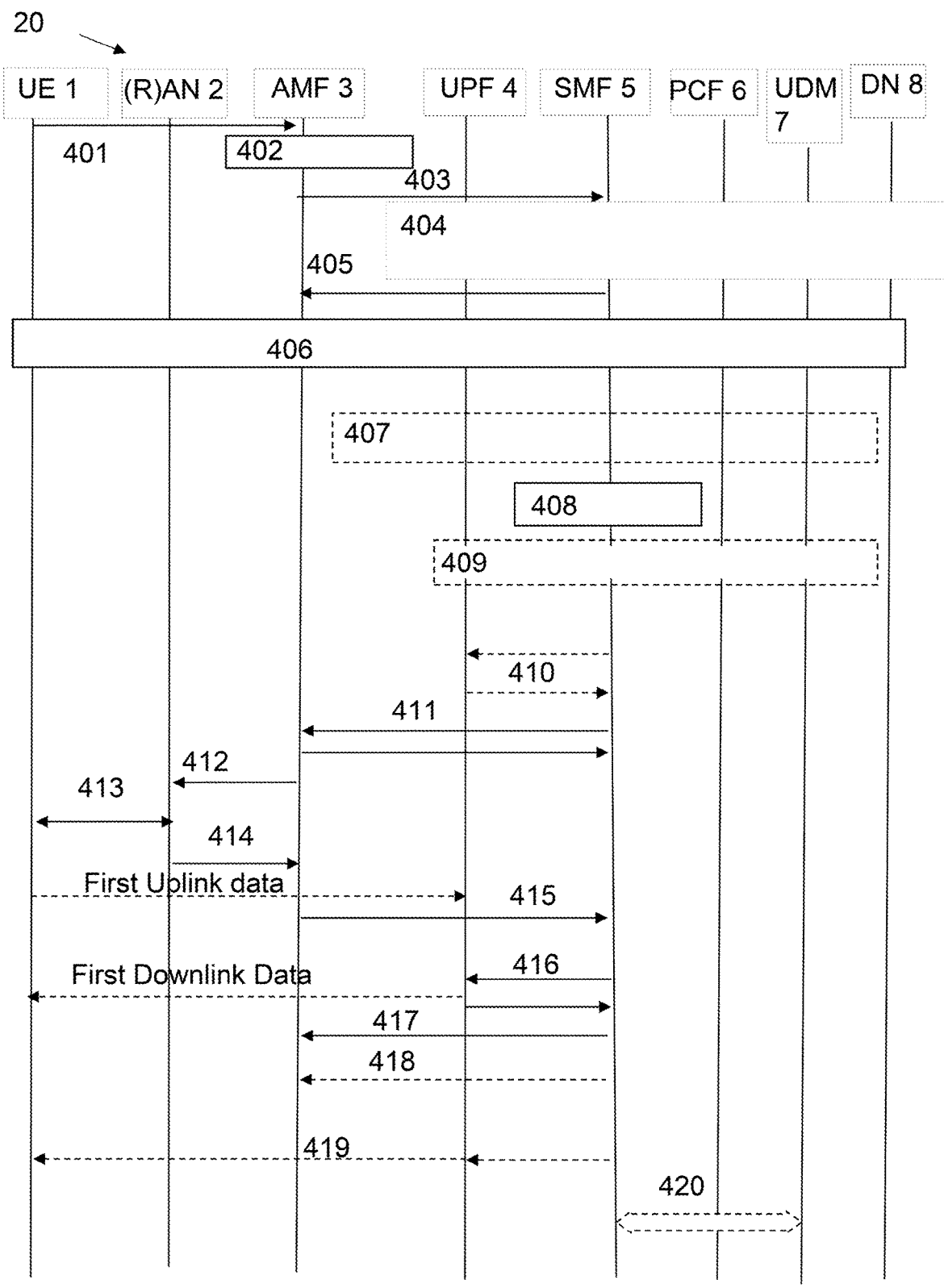
FIG. 7 is a signaling diagram in a telecommunications system network where the network can configure the UE and the UE can request for redundant user plane/PDU session for the URLLC services with the network based on the user plane policy configured at the UE side.

Based on the user plane policy configured at the UE side, the UE can request for redundant user plane/PDU session for the URLLC services with the network as shown in FIG. 7.

In FIG. 7, the UE 1 in a first step 401 sends the PDU session establishment message along with the configured/network provided "Network UP Redundancy ID" based on the configured Redundant UP Policy. Where the UE initiates the UE Requested PDU Session Establishment procedure by the transmission of a NAS message containing a PDU Session Establishment Request within the N1 SM container. The Request Type indicates "Initial request" or "Redundant UP Initial request" if the PDU Session Establishment is a request to establish a new PDU Session and indicates "Existing PDU Session" or "Existing Redundant UP PDU Session" if the request refers to an existing PDU Session switching between 3GPP access and non-3GPP access or to a PDU Session handover from an existing PDN connection in EPC.

Next, in a step 402 the AMF 3 selects a SMF 5. This can be performed in accordance with step 102 set out above.

Then, in a step 403, the AMF 3 sends to SMF 5, the Nsmf_PDUSession_CreateSMContext Request (SUPI, DNN, S-NSSAI(s), Network UP Redundancy ID(s), PDU Session ID, AMF ID, Request Type, PCF ID, Priority Access, N1 SM container (PDU Session Establishment Request), User location information, Access Type, PEI, GPSI, UE presence in LADN service area, Subscription For PDU Session Status Notification, DNN Selection Mode, Trace Requirements, Control Plane CIoT 5GS Optimisation indication) or Nsmf_PDUSession_UpdateSMContext Request (SUPI, DNN, S-NSSAI(s), Network UP Redundancy ID(s), SM Context ID, AMF ID, Request Type, N1 SM container (PDU Session Establishment Request), User location information, Access Type, RAT type, PEI).

Next, in a step 404, the SMF 5 verifies the "Network UP Redundancy ID" against the Redundant UP policy if available or using Nudm_SDM_Get operations receives the Redundant UP policy from UDM/UDR and subscribes to receive UE Redundant UP policy using Nudm_SDM_Subscribe. If the verification is successful, the SMF 5 can also check the QoS Monitoring results and current NF(s) QoS/load condition to determine the UP redundancy. When the SMF determines to have UP redundancy for the PDU session, the SMF generates the RSN1 corresponding to the PDU Session 1 and RSN2 corresponding to the redundant PDU session that need to be established.

Next, in a step 405, the SMF 5 sends to AMF 3, the Nsmf_PDUSession_CreateSMContext Response (Cause, SM Context ID or N1 SM container (PDU Session Reject (Cause))) accordingly. In accordance with one embodiment, the PDU session creation will either be successful or failure based on the verification of the "Network UP Redundancy ID" at the SMF and based on the network/network function conditions. network load, NF service load, or Network QoS support. These network conditions in 5GS can be analyzed/identified based on monitoring, real time or predictions. The network conditions can also be provided as analytics by NWDAF or by any operator specific procedure. In accordance with another embodiment, the 5G Session Management (SGSM) cause information element can include the following one or more new clause values specific to the Redundant PDU session establishment failure:
  i. Redundancy Not Supported (Size: Any 8 bits)
  ii. Redundancy Not Required (Size: Any 8 bits)
  iii. Resource Not Available for Redundant User plane (Size: Any 8 bits)

Then, in a step 406, an Optional Secondary authentication/authorization can be performed.

Next, in a step 407, if dynamic PCC is to be used for the PDU Session, the SMF performs PCF selection as described in TS 23.501, clause 6.3.7.1. Otherwise, the SMF may apply local policy. Also, the SMF 5 can perform an SM Policy Association Establishment procedure as defined in TS 23.501 clause 4.16.4 to establish an SM Policy Association with the PCF and get the default PCC Rules for the PDU Session.

Next, in step 408, if the Request Type in step 3 indicates "Initial request" or "Redundant UP Initial request", the SMF selects an SSC mode for the PDU Session as described in TS 23.501 clause 5.6.9.3. The SMF also selects one or more UPFs as needed as described in TS 23.501 clause 6.3.3.

Then, in a step 409. The SMF 5 may perform an SMF initiated SM Policy Association Modification procedure as defined in TS 23.501 clause 4.16.5.1 to provide information on the Policy Control Request Trigger condition(s) that have been met.

Next, in a step 410, if Request Type indicates "initial request" or "Redundant UP Initial request", the SMF initiates an N4 Session Establishment procedure with the selected UPF, otherwise it initiates an N4 Session Modification procedure with the selected UPF.

Then, in a step 411, the SMF sends to the AMF, the Namf_Communication_N1N2MessageTransfer (PDU Session ID and the N2 SM information along with RSN1, RSN2 and the Redundancy status information. The Redundancy Status information can include values/indicator to denotes whether a Redundancy is required/provided or not for a particular PDU session/QoS flow of the PDU session. The N2 SM information includes (PDU Session ID, QFI(s), QoS Profile(s), CN Tunnel Info, S-NSSAI from the Allowed NSSAI, Session-AMBR, PDU Session Type, User Plane Security Enforcement information, UE Integrity Protection Maximum Data Rate, RSN1, RSN2, Redundancy Status), N1 SM container (PDU Session Establishment Accept (QoS Rule(s) and QoS Flow level QoS parameters if needed for the QoS Flow(s) associated with the QoS rule(s), selected SSC mode, S-NSSAI(s), RSN1, RSN2, Redundancy Status, DNN, allocated IPv4 address, interface identifier, Session-AMBR, selected PDU Session Type, Reflective QoS Timer (if available), P-CSCF address(es), Header Compression Configuration, [Always-on PDU Session]))). If multiple UPFs are used for the PDU Session, the CN Tunnel Info contain tunnel information related with the UPF that terminates N3. The AMF can store the RSN1, RSN2, Redundancy Status received from the AMF to identify the subsequent Redundant PDU session request for same SMF selection. In accordance with one embodiment, based on the Network UP Redundancy ID verification at the SMF and the network/network function conditions defined earlier, the Redundancy Status information can either contain success or failure accordingly.

Then, in a step 412, the AMF 3 sends to (R)AN the N2 PDU Session Request (N2 SM information, NAS message (PDU Session ID, N1 SM container (PDU Session Establishment Accept, RSN1, RSN2, Redundancy Status (Required/Success/Not Required/Failure))), CN assisted RAN parameters tuning). The AMF sends the NAS message containing PDU Session ID, RSN1, RSN2, Redundancy Status and PDU Session Establishment Accept targeted to the UE and the N2 SM information received from the SMF within the N2 PDU Session Request to the (R)AN. If the SMF derived CN assisted RAN parameters tuning are stored for the activated PDU Session(s), the AMF may derive updated CN assisted RAN parameters tuning and provide them the (R)AN. The (R)AN can store the RSN1, RSN2, Redundancy Status received from the AMF to identify the subsequent Redundant PDU session request for same AMF selection.

Thereupon, in a step 413, the (R)AN 2 forwards the NAS message (PDU Session ID, RSN1, RSN2, Redundancy Status, N1 SM container (PDU Session Establishment Accept)) provided in step 412 to the UE 1. In accordance with one embodiment, the 5G Session Management (SGSM) cause information element can include the following one or more new clause values specific to the Redundant PDU session establishment failure:
  i. Redundancy Not Supported (Size: Any 8 bits)
  ii. Redundancy Not Required (Size: Any 8 bits)
  iii. Resource Not Available for Redundant User plane (Size: Any 8 bits)

Then steps 414-420 can be performed in accordance with steps 114-120 above.

Figure 8:
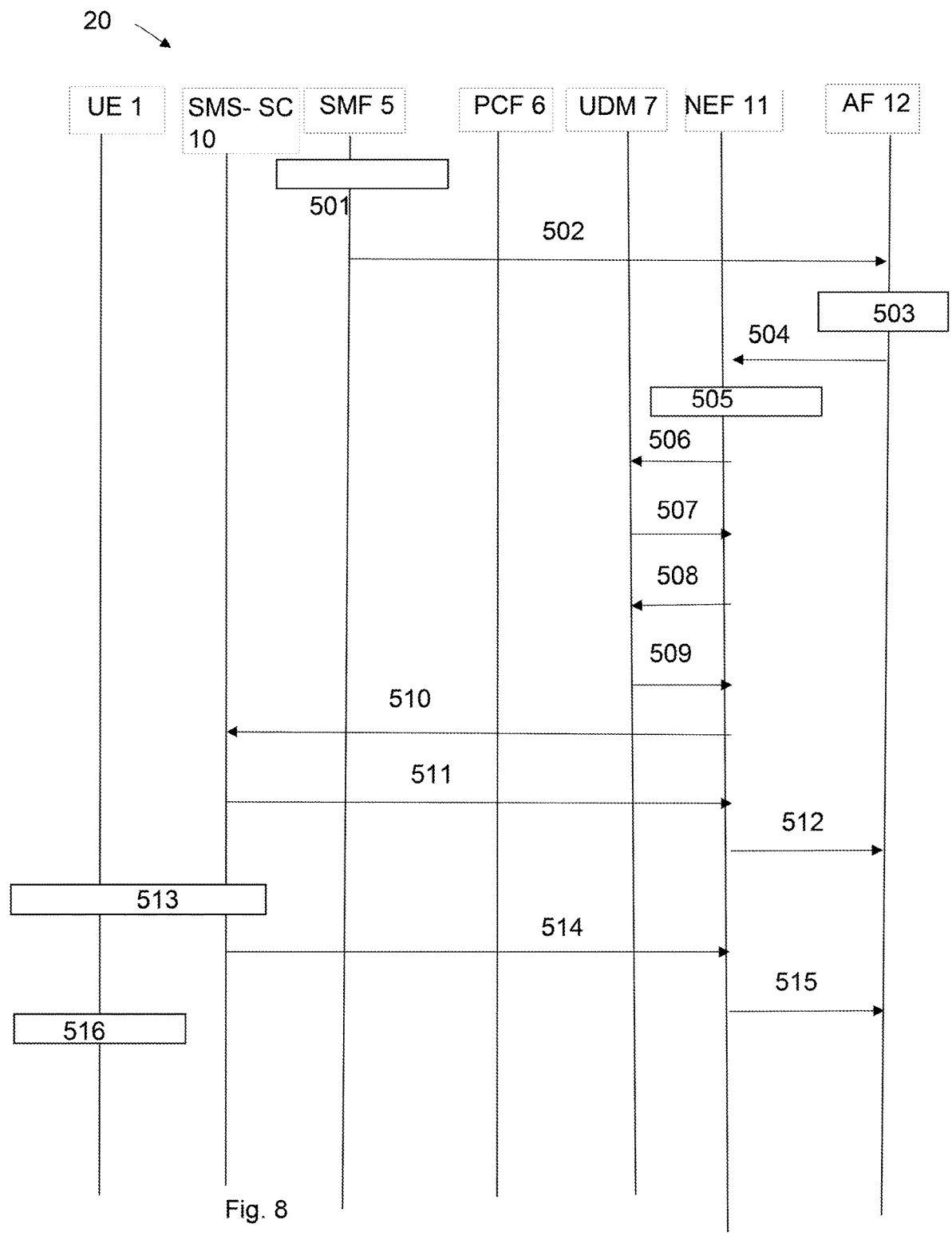
FIGS. 8 and 9 illustrate different examples of signaling diagrams where the network initiates PDU Session Establishment for a Redundant PDU Session.
Figure 9:
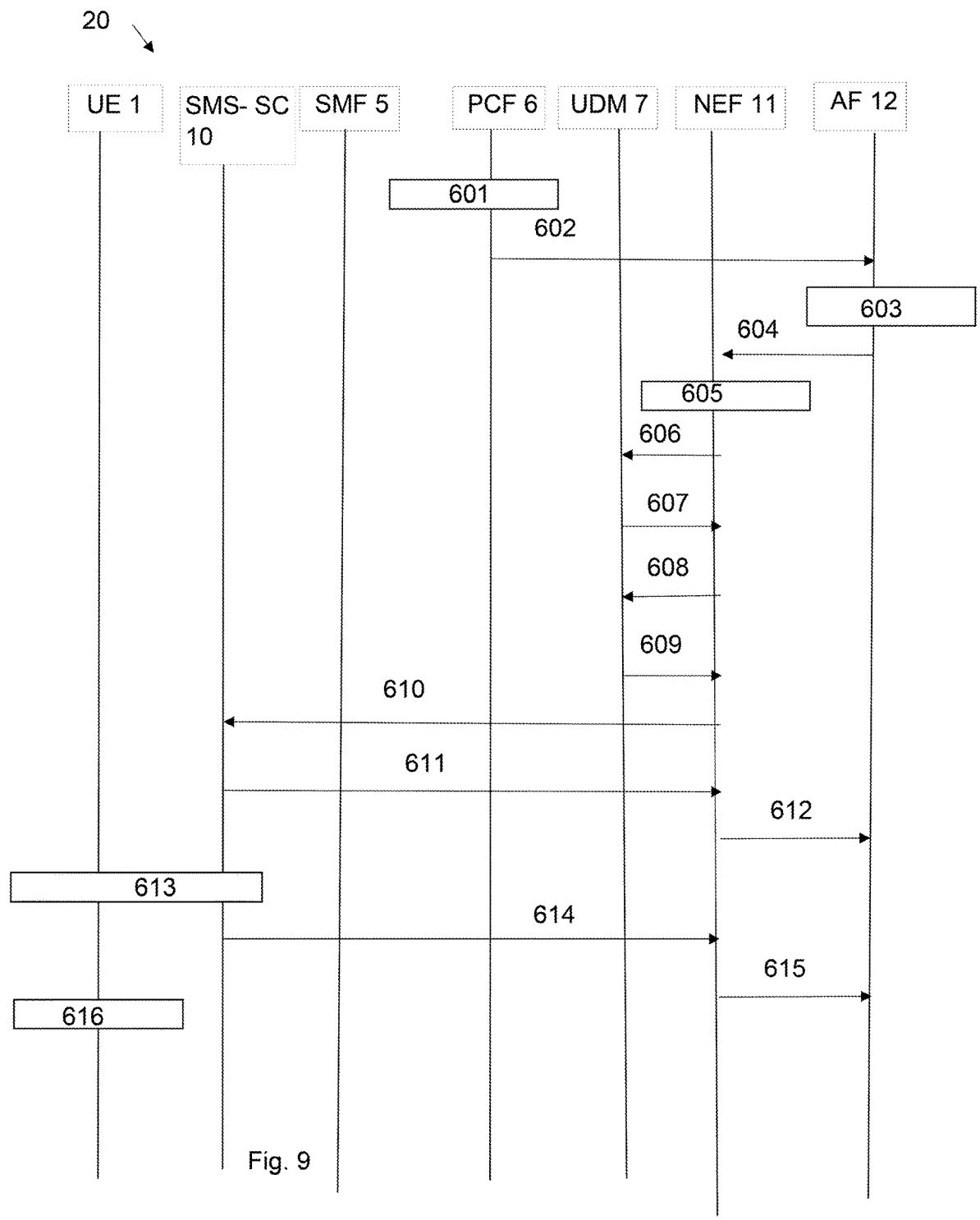

In accordance with some embodiments, the network can initiate PDU Session Establishment for Redundant PDU Session. Such embodiments are shown in FIGS. 8 and 9. When a particular network's/network function's conditions such as load, QoS support characteristics, performance metric exceeds a negative critical threshold, the network or the network functions such as SMF 5 or PCF 6 or both can determine the necessity for a redundant PDU session in compliment to an already established/existing on-going PDU session as shown in the steps 501 and 601. The NWDAF can also provide these network load, QoS and performance related information to the SMF or PCF which eventually supports them to take a decision on the user plane/PDU session redundancy requirement.

The network functions such as SMF or PCF or a node such a gNB can send Redundant PDU session trigger message to an application function (AF) either directly or through a Network Exposure Function NEF 11 accordingly in a step 502, 602. This message contains information on s-NSSAI, DNN, DNAI, UE ID (SUPI/GPSI), Redundancy Indicator (RSN2). The SMF/PCF can then send this message through NEF, the NEF transfers this information into AS Service ID and sends the AF Service ID along with the GPSI to the AF 12.

Then, the AF 12 can determine the requirement for the trigger specific to the Redundant PDU session based on the AF Service ID.

Then in steps 504-516 and 604-616 respectively, the AF 12 can send a trigger, in a step 504, 604, for the redundant PDU session establishment procedure by sending the "Redundancy Required Indicator" along with the PDU Session information and PDU session ID(s) in the device trigger message to application(s) on the UE side. The SMF/PCF can receive QoS change analytics and/or NF load analytics and NF performance analytics information the NWDAF. Based on these information, the SMF/PCF can determine if a user plane redundancy is required for an URLLC service. Following this determination, the SMF/PCF can send the Redundant PDU Session Trigger Request with the "Redundancy Requirement information" along with s-NSSAI, DNN, DNAI, "Redundant UP Required Indicator", AF Service ID and UE ID to the AF through the NEF to initiate the Device Trigger at the AF side. A possible other option is that, the AF receives the QoS change analytics information from the NWDAF either directly or through NEF and determines if a user plane redundancy is required for an ongoing/upcoming URLLC service. The payload included in Device Trigger Request message contains information on which application on the UE side is expected to trigger the PDU Session establishment request. Based on that information, the application(s) on the UE side trigger the PDU Session Establishment procedure. The device trigger procedure works same as specified in the TS 23.502 Clause 4.13.2 except the new IEs which are specific to the Redundant PDU trigger request and processing. The AF on receiving such a redundant PDU session trigger request message, sends the Trigger Delivery Request message with the received information from SMF/PCF to the NEF (if involved). The NEF checks that the AF is authorized to send trigger requests and that the AF has not exceeded its quota or rate of trigger submission over Nnef. If this check fails, the NEF sends an Nnef_Trigger_Delivery response with a cause value indicating the reason for the failure condition and the flow stops at this step. Otherwise, the flow continues with step 506/606 accordingly. The NEF invokes Nudm_SDM_Get (Identifier Translation, GPSI and AF Identifier) to resolve the GPSI to SUPI when the AF is authorized to trigger the UE. NOTE that optionally, mapping from GPSI (External Id) to GPSI (MSISDN) is also provided for legacy SMS infrastructure not supporting MSISDN-less SMS. The UDM may invoke the Nudr_DM_Query service to retrieve a list of AF's that are allowed to trigger the UE and determines, based on UDM policy, which identifier (SUPI or MSISDN) should be used to trigger the UE. The UDM provides a Nudm_SDM_Get response (SUPI, optionally MSISDN. If the AF is not allowed to send a trigger message to this UE, or there is no valid subscription information for this user, the NEF sends an Nnef_Trigger_Delivery response with a cause value indicating the reason for the failure condition and the flow stops at this step. Otherwise this flow continues with step. Note that the presence of an MSISDN in the reply is interpreted as an indication to the NEF that MSISDN is used (instead of IMSI) to identify the UE when sending the SMS to the SMS-SC via T4. The NEF invokes Nudm-_UECM_Get (SUPI, SMS) to retrieve the UE SMSF identities. The UDM may invoke the Nudr_DM_Query service to retrieve the UE SMSF identities. The UDM provides a Nudm_UECM_Get response with the corresponding UE SMSF identities. UDM policy (possibly dependent on the VPLMN ID) may influence which serving node identities are returned. The NEF can cache serving node information for the UE. However, this can increase the probability of trigger delivery attempt failures when the cached serving node information is stale. The NEF selects a suitable SMS-SC based on configured information. In step 510 & 610, the NEF acts as an MTC-IWF and sends a Submit Trigger (UE ID, s-NSSAI, AF Identifier, DNN, DNAI, "Redundant UP Required Indicator", trigger reference number, validity period, priority, SMSF serving node ID(s) (if available, are obtained from UDM in step 509 &609), SMS Application port ID, trigger payload, Trigger Indication) message to the SMS-SC. If the NEF indicates that "Absent subscriber" was received from the UDM, the SMS-SC should not submit the message, but store it directly and send Routing Information for SM to request the UDM to add the SMS-SC address to the Message Waiting List. The SMS-SC sends a Submit Trigger Confirm message to the NEF to confirm that the submission of the SMS has been accepted by the SMS-SC. The NEF sends a Nnef_Trigger_Delivery response to the AF to indicate if the Device Trigger Request has been accepted for delivery to the UE. The SMS_SC performs MT SMS delivery as defined in TS 23.502 clause 4.13.3. The SMS-SC may provide the routing information that it received in step 508 & 608 to SMS-GMSC to avoid UDM interrogation. The SMS-SC generates the necessary CDR information and includes the AF Identifier. The SMS Application port ID, which is included in the SM User Data Header, and the Trigger Indication are included in the CDRs in order to enable differentiated charging. The SMS-SC stores the trigger payload, without routing information. If the message delivery fails and is attempted to be delivered again, UDM interrogation will be performed. If the message delivery fails and the validity period of this trigger message is not set to zero, the SMS-SC shall send a SM Message Delivery Status Report to request the UDM to add the SMS-SC address to the Message Waiting list. When the message delivery is later re-attempted, a new UDM interrogation will be performed by the SMS-GMSC using SUPI or MSISDN. UDM interrogations using SUPI shall not be forwarded or relayed to SMS-Router or IP-SM-GWs. The UDM may include up to four serving node identities (MSC or MME, SGSN, IP-SM-GW, AMF) in the response to SMS-GMSC. If the message delivery fails (either directly or when validity period of the trigger message expires) or when the message delivery succeeds, the SMS-SC shall send a Message Delivery Report (cause code, trigger reference number, AF Identifier) to the NEF. The NEF provides a Nnef_Trigger_Delivery-Notify message to the AF with a Delivery Report indicating the trigger delivery outcome (e.g. succeeded, unknown or failed and the reason for the failure). The NEF generates the necessary CDR information including the GPSI and AF Identifier. In response to the received device trigger, the UE takes specific actions and may take into consideration the content of the trigger payload. This action typically involves initiation of immediate or later communication with the AF. At the successful MT SMS Delivery of the Indication for the Redundant PDU Session Requirement along with the s-NSSAI, DNN, DNAI and UE ID, the UE sends a corresponding Redundant PDU session establishment request message to the 5G system as an action for the Device Trigger Message received from the AF.

What is claimed is:

1. A network function configured for operation in a mobile telecommunications network, the network function being configured to:
   obtain from a User Equipment (UE) a Protocol Data Unit (PDU) session request for establishment of a redundant PDU session;
   determine whether the redundant PDU session is to be established based on at least one network condition, wherein the at least one network condition comprises one or more of:
   a threshold of network load,
   a threshold of network function load,
   a threshold of network function service load,
   a threshold of network function performance,
   a threshold of network function Quality of Service (QOS) support, or
   a threshold of network QoS support;
   provide the UE of the outcome of the determination if the redundant PDU session is to be established;
   verify that the obtained request for the redundant PDU session from the UE is to be established before establishing the redundant PDU session for said UE; and
   verify that the obtained request for the redundant PDU session from the UE is to be established by determining that preconfigured redundancy information for the UE in the obtained request for the redundant PDU session matches with redundancy information available at the network for the UE and an Ultra Reliable Low Latency Communication (URLLC) service for the UE.

2. The network function according to claim 1, wherein the network function is further configured to:
   provide the UE with an indication as to why a redundant session cannot be established when it is determined that the redundant PDU session cannot be established, wherein the network function is configured to send an indication comprising at least one of:
   Redundancy Not Supported;
   Redundancy Not Required;
   Resource Not Available for Redundant User plane;
   Redundancy user plane supported with other network options; or
   when the redundant PDU session cannot be established.

3. The network function according to claim 1, wherein the network function is configured to
   verify that the obtained request for the redundant PDU session from the UE is to be established by determining that at least one network condition is met.

4. The network function according to claim 1, wherein the network function is configured to:
   obtain a list of redundancy policies for at least one UE; and
   configure the redundant PDU session for the UE based on the redundancy policy associated with the UE in the list of redundancy policies.

5. The network function according to claim 1, wherein the PDU session request is a request for a second redundant PDU session from a UE involved in a first PDU session.

6. The network function according to claim 1, wherein the PDU session request is a request for an Ultra Reliable Low Latency Communication (URLLC) service.

7. A method in a network function configured for operation in a mobile telecommunications network, the method comprising:
   obtaining, from a User Equipment (UE) a Protocol Data Unit (PDU) session request for establishment of a redundant PDU session;
   determining the redundant PDU session to be established based on at least one network condition, wherein the at least one network condition comprises one or more of:
   a threshold of network load,
   a threshold of network function load,
   a threshold of network function service load,
   a threshold of network function performance,
   a threshold of network function QoS support, or
   a threshold of network QoS support;
   providing the UE of the outcome of the determination if the redundant PDU session is to be established;
   verifying that the obtained request for the redundant PDU session from the UE is to be established before establishing the redundant PDU session for said UE; and
   verifying that the obtained request for the redundant PDU session from the UE is to be established by determining that preconfigured redundancy information for the UE in the obtained request for the redundant PDU session matches with redundancy information available at the network for the UE and an Ultra Reliable Low Latency Communication (URLLC) service for the UE.

8. A non-transitory computer readable-medium storing instructions for performing a method in a network function configured for operation in a mobile telecommunications network, the instructions, when executed by a computer, configure the computer to perform the method comprising:
   obtaining, from a User Equipment (UE) a Protocol Data Unit (PDU) session request for establishment of a redundant PDU session;
   determining the redundant PDU session to be established based on at least one network condition, wherein the at least one network condition comprises one or more of:
   a threshold of network load,
   a threshold of network function load,
   a threshold of network function service load,
   a threshold of network function performance,
   a threshold of network function QoS support, or
   a threshold of network QoS support;
   providing the UE of the outcome of the determination if the redundant PDU session is to be established;
   verifying that the obtained request for the redundant PDU session from the UE is to be established before establishing the redundant PDU session for said UE; and
   verifying that the obtained request for the redundant PDU session from the UE is to be established by determining that preconfigured redundancy information for the UE in the obtained request for the redundant PDU session matches with redundancy information available at the network for the UE and an Ultra Reliable Low Latency Communication (URLLC) service for the UE.

9. The non-transitory computer-readable medium according to claim 8, wherein the method further comprises:
provulating the UE with an indication as to why a redundant session cannot be established when it is determined that the redundant PDU session cannot be established, wherein the network function is configured to send an indication comprising at least one of:
Redundancy Not Supported;
Redundancy Not Required;
Resource Not Available for Redundant User plane;
Redundancy user plane supported with other network options; or
when the redundant PDU session cannot be established.

10. The non-transitory computer-readable medium according to claim 8, wherein the method further comprises:
verifying that the obtained request for the redundant PDU session from the UE is to be established by determining that at least one network condition is met.

11. The non-transitory computer-readable medium according to claim 8, wherein the method further comprises:
obtaining a list of redundancy policies for at least one UE; and
configuring the redundant PDU session for the UE based on the redundancy policy associated with the UE in the list of redundancy policies.

* * * * *

UNITED STATES PATENT AND TRADEMARK OFFICE
CERTIFICATE OF CORRECTION

| | |
|---|---|
| PATENT NO. | : 12,048,037 B2 |
| APPLICATION NO. | : 17/548195 |
| DATED | : July 23, 2024 |
| INVENTOR(S) | : Mary et al. |

Page 1 of 1

It is certified that error appears in the above-identified patent and that said Letters Patent is hereby corrected as shown below:

In the Claims

Claim 1: Column 17, Line 34: reads as "(QOS) support, or" should read as -- (QoS) support, or --.

Signed and Sealed this
Twenty-second Day of April, 2025

Coke Morgan Stewart
*Acting Director of the United States Patent and Trademark Office*